(12) United States Patent
Krüger et al.

(10) Patent No.: US 8,857,411 B2
(45) Date of Patent: Oct. 14, 2014

(54) PISTON ENGINE, METHOD AND USE

(75) Inventors: Jan Krüger, Neuhausen (DE); Rolf Jebasinski, Fillderstadt (DE)

(73) Assignee: J. Eberspaecher GmbH & Co. KG, Esslingen (DE)

( * ) Notice: Subject to any disclaimer, the term of this patent is extended or adjusted under 35 U.S.C. 154(b) by 486 days.

(21) Appl. No.: 13/096,357

(22) Filed: Apr. 28, 2011

(65) Prior Publication Data

US 2011/0265763 A1    Nov. 3, 2011

(51) Int. Cl.
*F02B 27/00* (2006.01)
*F02B 27/04* (2006.01)

(52) U.S. Cl.
CPC .............. *F02B 27/04* (2013.01); *F02B 27/001* (2013.01); *Y02T 10/146* (2013.01)
USPC ............................................ 123/434; 123/676

(58) Field of Classification Search
CPC ......... F02D 35/02; F02D 41/00; F02D 41/14; F02D 41/24; F02M 25/07; F02M 35/12; F02B 25/00; F02B 33/42
USPC ............. 123/434–436, 559.2, 672, 676, 65 E, 123/184.57; 701/103, 104
See application file for complete search history.

(56) References Cited

U.S. PATENT DOCUMENTS

| 5,048,470 | A | * | 9/1991 | Geddes et al. | 123/184.42 |
|---|---|---|---|---|---|
| 5,060,271 | A | * | 10/1991 | Geddes | 381/71.5 |
| 5,101,626 | A | | 4/1992 | Blair | |
| 5,284,123 | A | * | 2/1994 | Dones | 123/559.2 |
| 5,307,767 | A | | 5/1994 | Schutz | |
| 5,445,517 | A | * | 8/1995 | Kondou et al. | 431/18 |
| 5,515,832 | A | * | 5/1996 | Bidner et al. | 123/568.14 |
| 5,571,239 | A | * | 11/1996 | Kameda et al. | 123/184.53 |
| 6,202,409 | B1 | * | 3/2001 | Taylor | 60/312 |
| 6,732,509 | B2 | * | 5/2004 | Shiga | 60/312 |
| 7,650,867 | B2 | * | 1/2010 | Williams | 123/184.55 |
| 2004/0089278 | A1 | * | 5/2004 | Ekenberg | 123/559.2 |
| 2004/0094111 | A1 | | 5/2004 | Concialdi | |
| 2006/0086564 | A1 | * | 4/2006 | Kostun et al. | 181/250 |
| 2008/0173271 | A1 | * | 7/2008 | Prior et al. | 123/184.57 |
| 2008/0223045 | A1 | * | 9/2008 | Laforest et al. | 60/768 |
| 2009/0057054 | A1 | * | 3/2009 | Kostun et al. | 181/206 |
| 2010/0242471 | A1 | * | 9/2010 | Tomoda et al. | 60/602 |

FOREIGN PATENT DOCUMENTS

| DE | 4217630 C1 | 9/1993 |
| DE | 20207300 U1 | 10/2002 |
| DE | 10128721 A1 | 1/2003 |

* cited by examiner

*Primary Examiner* — John Kwon
*Assistant Examiner* — Johnny H Hoang
(74) *Attorney, Agent, or Firm* — Reinhart Boerner Van Deuren P.C.

(57) ABSTRACT

The present invention relates to a method for operating a piston engine, more preferably of a motor vehicle, with a fresh air system for feeding fresh air to cylinders of the piston engine and with an exhaust system for discharging exhaust gas from the cylinders, wherein during a gas exchange by a positive pressure wave on the fresh air side the charging of the respective cylinder with fresh air and/or by a negative pressure wave on the exhaust gas side the discharging of exhaust gas from the respective cylinder is supported.
An increased variability is obtained if the respective pressure wave is generated by at least one electroacoustic converter.

13 Claims, 2 Drawing Sheets

PISTON ENGINE, METHOD AND USE

CROSS-REFERENCE TO RELATED PATENT APPLICATIONS

This patent application claims the benefit of German Patent Application No. 10 2010 018659.7, filed Apr. 28, 2010, the entire teachings and disclosure of which are incorporated herein by reference thereto.

FIELD OF THE INVENTION

The present invention relates to a method for operating a piston engine, more preferably a motor vehicle. The invention additionally relates to a piston engine, more preferably of a motor vehicle. In addition the present invention relates to a use of an electroacoustic converter.

BACKGROUND OF THE INVENTION

A piston engine comprises several cylinders in which pistons are stroke-adjustably arranged and in which combustion chambers are formed. A fresh air system serves for the feeding of fresh air to the cylinders. An exhaust system serves for the discharge of exhaust gas from the cylinders. During a gas exchange, exhaust gas formed following a combustion process is discharged from the cylinder and fresh air for the next combustion process supplied. For controlling the gas exchange, gas exchange valves, namely inlet valves and exhaust valves are usually provided.

For performance increase and efficiency improvement as well as emission reduction it is known to utilise dynamic flow effects which develop in the fresh air system for the gas exchange. Through the gas exchange processes vibrations occur in the fresh air system. Through resonant or pulse tubes resonance effects can be utilised in order to improve the charging of the cylinders with fresh air. In order to be able to achieve such a charge improvement also at different rotational speeds of the piston engine, adjustable pulse tubes are generally known, with which for low rotational speeds of the piston engine a comparatively large pulse tube length can be adjusted, while for higher rotational speeds of the piston engine a comparatively short pulse tube length can be adjusted.

In addition, different charging devices are known such as for example compressors and turbochargers, with which the pressure level in the fresh air fed to the cylinders can be increased. The charging of the cylinders can also be improved through this.

On the one hand, cleaning of the exhaust gases in order to reduce the emission values of the piston engine takes place in the exhaust system. On the other hand, damping of the sound generated by the piston engine and carried along in the exhaust gas also takes place in the exhaust system in order to reduce a sound emission of the piston engine. With modern exhaust systems active silencers, which are based on the principle of the anti-sound generation, can also be utilised. Such an active silencer contains at least one electroacoustic converter, which, as a rule, can be a loudspeaker, with the help of which anti-sound is actively generated, which with respect to the sound to be damped is phase-shifted in such a manner that upon the superimposition of sound and anti-sound as large as possible a mutual deletion is obtained. Such active silencers can be used with a fresh air system in order to dampen sound of the piston engine emitted on the fresh air side.

SUMMARY OF THE INVENTION

The present invention deals with the problem of stating an improved embodiment for a piston engine or for an associated operating method which is more preferably characterized by an improved gas exchange.

According to the invention, this problem is solved through the subjects of the independent claims. Advantageous embodiments are the subject of the dependent claims.

The invention is based on the general idea of improving the charge of the respective cylinder with fresh air with the help of a positive pressure wave on the fresh air side and to improve the discharge of the respective cylinder of exhaust gas with the help of a negative pressure wave on the exhaust side. According to the invention, the respective pressure wave is generated by means of at least one electroacoustic converter which for this purpose is connected to the fresh air system or to the exhaust system or integrated therein.

A positive pressure wave on the fresh air side which spreads in the fresh air system in the direction of cylinder and which is specifically matched to the gas exchange such that with closing inlet valve it can just still enter the cylinder but no longer escape from the cylinder thereafter, leads to a pressure increase in the respective cylinder and thus to an improved charging of the respective cylinder. A negative pressure wave on the exhaust side, which spreads in the exhaust system in the direction of the cylinder and which during a closing process of an exhaust valve is just able to still enter the respective cylinder but no longer able to escape from said cylinder thereafter, leads to a significant pressure reduction in the cylinder which is advantageous for the following charging with fresh air. The invention now utilises the realisation that with the help of electroacoustic converters which for the combating of interfering sound by means of anti-sound are known per se, such pressure waves, i.e. positive pressure waves in the fresh air system and negative pressure waves in the exhaust system can be generated in order to improve the gas exchange of the individual cylinders. A special advantage here is that such electroacoustic converters can be realised in a comparatively compact manner and are highly variable with respect to the pressure waves that can be generated. Thus, the pressure waves generated with the help of the electroacoustic converter can be particularly favourably adapted to the needs of the gas exchange processes even with varying operating states of the piston engine. For example, the amplitudes of the generated pressure waves can be varied. The frequency, with which the pressure waves are generated, can likewise be varied. Thus, a simple adaptation to varying rotational speeds of the piston engine is more preferably possible. In comparison with adjustable pulse tubes, which merely allow an adjustment of two different pulse tube lengths and thus merely an optimisation for two different rotational speeds, a considerable improvement is obtained with the help of the electroacoustic converter since suitable pressure waves can be generated quasi for every rotational speed of the combustion engine.

According to an advantageous embodiment the timing for generating the pressure waves can be determined relative to the ignition timing as a function of a rotational speed of the piston engine. Thus, for every rotational speed of the piston engine the electroacoustic converter can be operated so that the pressure waves generated with said converter timely arrive at each individual cylinder in order to enter the respective cylinder as positive pressure wave on the fresh air side immediately before the closing of the respective inlet valve or in order to enter the respective cylinder as negative pressure valve on the exhaust side immediately before the closing of the respective exhaust valve.

With another advantageous embodiment it can be provided relative to the ignition timing to determine the timing for generating the pressure waves as a function of a rotational speed of the piston engine and as a function of the temperature of the fresh air and/or the exhaust gas. Through the additional consideration of the temperature the sound propagation speed which changes with the temperature can be additionally taken into account. Consequently, the run time, which the respective pressure wave requires for the distance from the electroacoustic converter to the respective cylinder, can be better taken into account.

An embodiment, wherein the timing for generating the pressure wave relative to the ignition timing is determined in conjunction with a family of characteristics in which relative to the ignition timing the timing for generating the pressure wave is stored in characteristic curves as a function of the rotational speed, which characteristic curves are associated with different temperatures or temperature ranges of the exhaust gas or the fresh air. Control systems based on families of characteristics operate with high reliability and require comparatively little computer power.

With another embodiment the amplitudes of the pressure waves can be determined as a function of the current engine power. For example, it can be practical to generate large or maximum amplitudes at full load while lower amplitudes are generated at part load and no or minimal amplitudes are generated more preferably in idling mode. To couple the pressure wave amplitudes to the engine power it can for example be provided to take into account a signal from an engine control unit correlated to the current engine power. This embodiment is based on the idea that in an engine control unit the necessary information about the engine power is present anyway so that the provision or tapping of a signal correlated to the engine power on the engine control unit can be realised particularly easily.

According to another embodiment the amplitudes of the pressure waves can be set by means of a regulation which as regulating quantities takes into account measurement signals of a microphone and/or signals of an engine control unit. In this case a regulating circuit, which automatically adapts the pressure wave amplitudes to the current requirement, is established.

According to a particularly advantageous embodiment it can now be provided to use the electroacoustic converter cumulatively or alternatively for generating the pressure waves at least in certain rotational speed ranges and/or load ranges for generating anti-sound in order to dampen interference noises which spread in the fresh air system and/or in the exhaust system. Through this measure, the respective electroacoustic converter is given an additional function. On the one hand it is used for generating pressure waves according to the invention, with which the gas exchange processes are supported. On the other hand it is conventionally used in order to reduce the sound emission of the piston engine.

The invention thus also relates to a new kind of usage of an electroacoustic converter, namely for generating positive pressure waves in a fresh air system of a piston engine, which during a gas exchange support a charging of cylinders of the piston engine with fresh air, and/or for generating negative pressure waves in an exhaust system of a piston engine which during a gas exchange support discharging exhaust gas from cylinders of the piston engine. Here, such an electroacoustic converter can be exclusively provided in the fresh air system or in the exhaust system for this task. It is likewise possible to additionally operate an electroacoustic converter provided in the fresh air system or in the exhaust system anyway for sound damping by means of anti-sound for supporting the gas exchange processes.

Further important features and advantages of the invention are obtained from the subclaims, from the drawings and from the corresponding figure description by means of the drawings.

It is to be understood that the features mentioned above and still to be explained in the following cannot only be used in the respective combination stated but also in other combinations or by themselves without leaving the scope of the present invention.

BRIEF DESCRIPTION OF THE DRAWINGS

Preferred exemplary embodiments of the invention are shown in the drawings and are explained in more detail in the following description, wherein same reference characters refer to same or similar or functionally same components.

It shows, in each case schematically.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
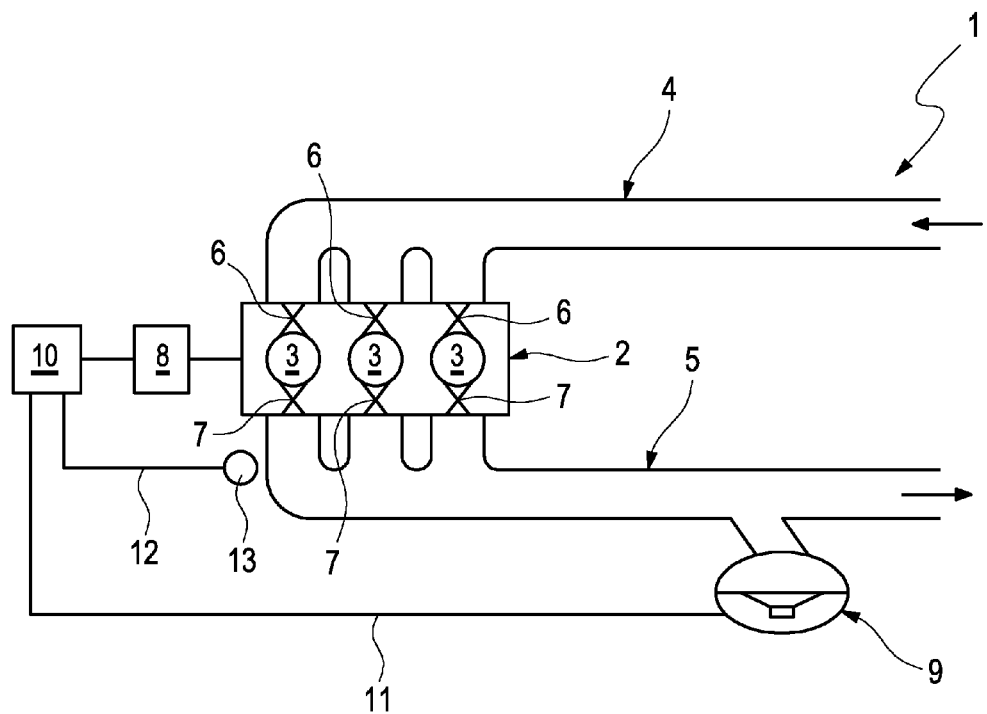
FIGS. 1 to 3 are in each case a highly simplified elementary representation of a piston engine with various embodiments.
Figure 2:
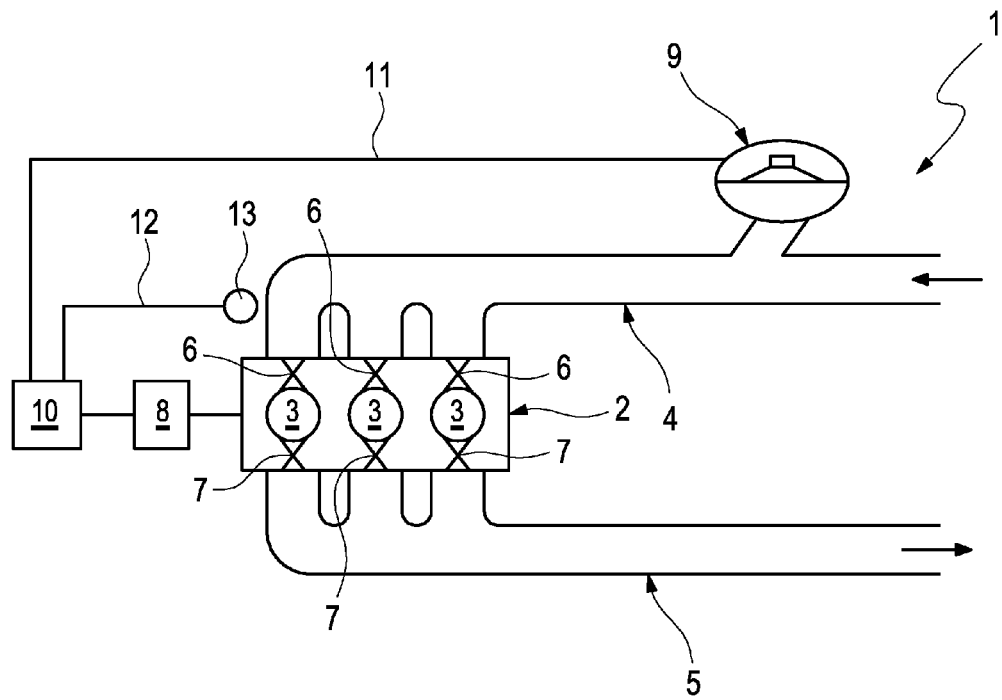
Figure 3:
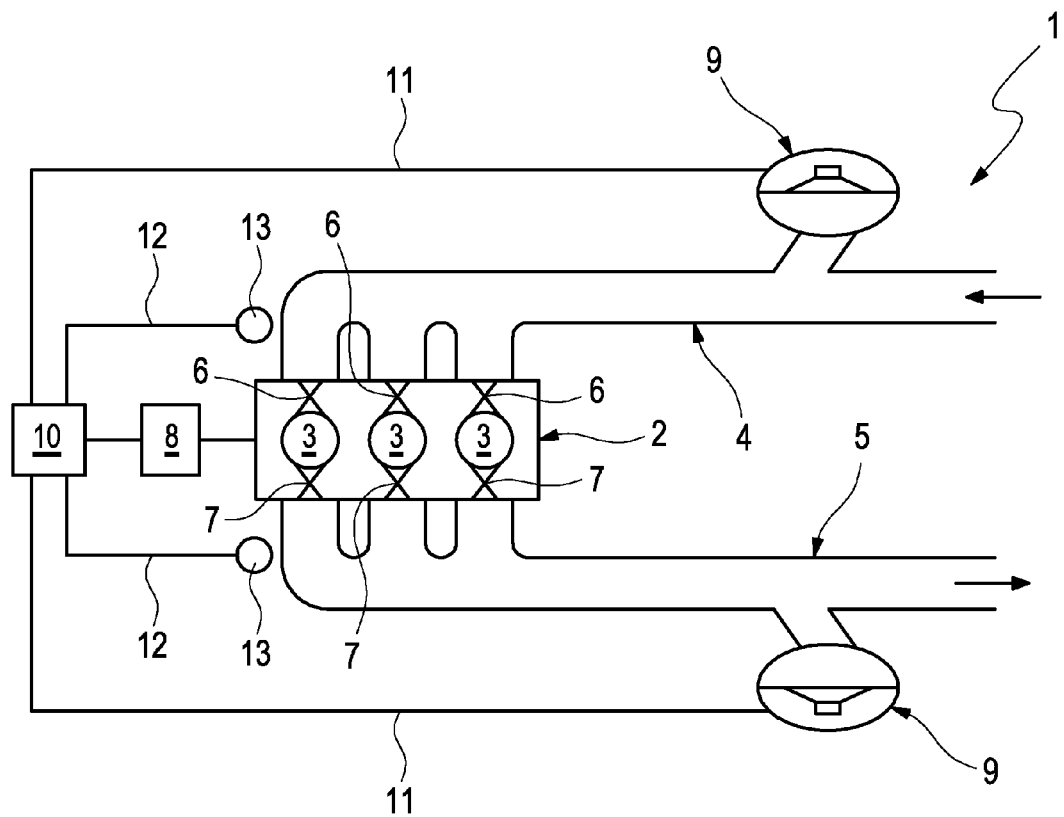

According to FIGS. 1 to 3 a piston engine 1 in an engine block 2 comprises several cylinders 3, a fresh air system 4 and an exhaust system 5. Usually such a piston engine 1 is arranged in a motor vehicle. In principle, stationary applications are also conceivable however.

The fresh air system 4 serves for the feeding of fresh air to the cylinders 3. The exhaust system 5 serves for discharging exhaust gas from the cylinders 3. To control the gas exchange processes, the cylinders 3 are assigned gas exchange valves, namely each at least one inlet valve 6 and at least one exhaust valve 7. It is clear that two or more inlet valves 6 or exhaust valves 7 can be provided for each cylinder 3. For operating the piston engine 1 an engine control unit 8, which is coupled in a suitable manner to the components of the piston engine 1 to be controlled, is usually also provided.

The piston engine 1 introduced here additionally comprises at least one electroacoustic converter 9 which is coupled to the fresh air system 4 or with the exhaust system 5. With the embodiment shown in FIG. 1 a single such electroacoustic converter 9 is provided, which is connected to the exhaust system 5. With the embodiment shown in FIG. 2 a single electroacoustic converter 9 is provided, which is connected to the fresh air system 4. With the embodiment shown in FIG. 3, exactly two electroacoustic converters 9 are provided, of which the one is connected to the fresh air system 4 while the other is connected to the exhaust system 5. In principle, an embodiment is also conceivable wherein a single electroacoustic converter 9 is connected to both the fresh air system 4 as well as to the exhaust system 5.

For actuating the respective electroacoustic converter 9 a control device 10 is provided, which is connected with the respective converter 9 via at least one control line 11. In addition to this, it can be optionally provided that the control device 10 is coupled to at least one microphone 13 via a suitable signal line 12. With a converter 9 arranged on the exhaust gas side, the microphone 13 can be arranged in the region of the exhaust system 5, which is reflected in FIG. 1. With a converter 9 on the fresh air side the microphone 13 can be arranged in the region of the fresh air system 4, which is shown in FIG. 2. FIG. 3 shows an embodiment with two microphones 13, of which the one is arranged on the fresh air system 4 while the other one is arranged on the exhaust system 5. With the help of the respective microphone 13 the control device 10 can establish a regulating circuit with the help of which the actuation of the respective converter 9 can be effected in a regulated manner. In FIGS. 1 to 3, two alternative positioning possibilities are indicated for each microphone 13, namely in each case a positioning close to the engine, in the fresh air downstream or in the exhaust gas upstream of the respective converter 9, as well as a positioning distant from the engine, in the fresh air upstream or in the exhaust gas downstream of the respective converter 9.

The piston engine 1 introduced here can be described as follows:

During the operation of the piston engine 1 gas changes continuously take place, during which in the respective cylinder 3 following a combustion process, exhaust gas is discharged from the cylinder 3 and subsequently fresh air is fed to the respective cylinder 3 for the next combustion process. To this end, the gas exchange valves 6, 7 are suitably actuated. To improve these gas exchange processes, the control device 10 can activate the respective electroacoustic converter 9 for generating pressure waves.

The control device 10 can specifically activate the converter 9 according to the FIGS. 1 and 3 assigned to the exhaust system 5 for generating negative pressure waves, which are so matched to the gas exchange processes that on the respective cylinder 3 a negative pressure wave can still enter the respective cylinder 3 before the associated exhaust valve 7 closes completely. Because of this, the negative pressure introduced in the respective cylinder 3 with the help of the negative pressure wave is trapped in the cylinder 3, which substantially improves the subsequent charging with fresh air. On opening of the associated inlet valve 6 the fresh air is quasi sucked into the respective cylinder 3.

Insofar as the respective electroacoustic converter 9 as in the FIGS. 2 and 3 is assigned to the fresh air system 4, the control device 10 can activate the respective converter 9 for generating a positive pressure wave. The generation of such positive pressure waves in this case is again specifically matched to the gas exchange processes so that a positive pressure wave can enter the respective cylinder 3 immediately before the respective inlet valve 6 closes. Because of this, this positive pressure wave is trapped in the respective cylinder 3, as a result of which the charging of the cylinder 3 is improved there.

In order to be able to specifically generate the pressure waves so that they can be trapped in the respective cylinder 3 the timing at which the respective pressure wave is generated by the respective converter 9 is of decisive importance. The control device 10 can now determine the timing for generating the pressure waves as a function of a rotational speed of the piston engine 1. The control device 10 knows the rotational speed of the piston engine 1 for example from the engine control unit 8, to which the control device 10 is coupled in a suitable manner. Practically the control device 10 in determining the timing for the generation of the pressure waves additionally takes into account the current temperature of the fresh air or of the exhaust gas. Corresponding temperature sensors are not shown here. More preferably, such temperature values can also be accessed from the engine control unit 8, provided such temperature sensors are provided for other purposes anyway. By taking into account the current temperature the dependency of the sound propagation speed on the temperature can be taken into account in the respective gas, fresh air or exhaust gas and compensated accordingly.

Particularly practical in this case is an embodiment wherein the control device 10 utilises a family of characteristics in which several characteristic curves are stored, which are assigned to different temperatures or different temperature ranges and in which in each case the relationship between the timing for generating the pressure wave and the rotational speed of the piston engine 1 is stored.

In addition to the timing, at which the pressure waves are generated by the respective converter 9, the control device 10 can additionally vary the amplitudes of the pressure waves. Practically, an adaptation of the amplitudes of the pressure waves can be realised as a function of the current engine output. To this end, the control device 10, more preferably in conjunction with the engine control unit 8, determines the current engine output and as a function of this controls the respective converter 9 for generating pressure waves with the amplitudes suitably adapted to the engine output.

Alternatively it is likewise possible to set the amplitudes of the pressure waves by means of a regulation. The control device 10 in this case can take into account the measurement signals of the respective microphone 13 as regulating quantity. Alternatively or additionally the control device 10 can also take into account signals of the engine control unit 8 as regulating quantity. For example, a combination of the microphone signals with the current engine output can be used in order to regulate the pressure wave amplitudes.

According to a particularly advantageous embodiment it is possible at least in certain rotational speed ranges and/or load ranges to use the respective converter 9 with the help of the control device 10 for thus generating anti-sound in order to dampen interference noises which spread in the fresh air system 4 or in the exhaust system 5. Here, the generation of anti-sound can be realised cumulatively to the generation of the previously described pressure waves for improving the gas exchange. To this end, the anti-sound waves and the pressure waves, which are generated with the help of the respective converter 9, are simply superimposed. It is likewise possible in certain rotational speed ranges to alternatively operate the respective electroacoustic converter 9, that is in certain rotational speed ranges exclusively for generating pressure waves which improve the gas exchange processes and in other rotational speed ranges exclusively for generating anti-sound in order to dampen interference noises.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for operating a piston engine with a fresh air system for feeding fresh air to cylinders of the piston engine at a fresh air side thereof and with an exhaust system for discharging exhaust gas from the cylinders at an exhaust gas side thereof, comprising:
    wherein during a gas exchange at least one of the steps of charging of the respective cylinder with fresh air is supported by a positive pressure wave on the fresh air side and the discharging of exhaust gas from the respective cylinder is supported by a negative pressure wave on the exhaust gas side is conducted,
    wherein the respective positive or negative pressure wave is generated by means of at least one electroacoustic converter.

2. The method according to claim 1, wherein
timing for generating the respective positive or negative pressure waves is determined as a function of a rotational speed of the piston engine.

3. The method according to claim 1, wherein
timing for generating the respective positive or negative pressure waves is determined as a function of a rotational speed of the piston engine and as a function of a temperature of at least one of the fresh air and of the exhaust gas.

4. The method according to claim 1, wherein
the timing is determined in conjunction with a family of characteristics, in which the timing for generating the respective positive or negative pressure waves is stored in characteristic curves as a function of the rotational speed, which characteristic curves are assigned to different temperatures or temperature ranges.

5. The method according to claim 1, wherein
amplitudes of the respective positive or negative pressure waves are determined as a function of the current engine output.

6. The method according to claim 1, wherein
a signal correlated to a current engine output is taken into account, which is provided by an engine control unit.

7. The method according to claim 1, wherein
amplitudes of the pressure waves are set by means of a regulation, which as regulating quantities takes into account at least one of measurement signals of a microphone and signals of an engine control unit.

8. The method according to claim 1, wherein
the electroacoustic converter is used cumulatively or alternatively for generating the respective positive or negative pressure waves at least in at least one of certain rotational speed ranges and certain load ranges for generating anti-sound in order to dampen interference noises which spread in at least one of the fresh air system and the exhaust system.

9. A piston engine, comprising:
with a fresh air system for feeding fresh air to cylinders of the piston engine at a fresh air side thereof,
with an exhaust system for discharging exhaust gas from the cylinders at an exhaust gas side thereof,
with at least one electroacoustic converter which is connected to at least one of the fresh air system and to the exhaust system,
with a control device for operating the electroacoustic converter in such a manner that pressure waves generated by the electroacoustic converter as one of: 1) positive pressure waves on the fresh air side support the charging of the cylinder with fresh air and 2) negative pressure waves on the exhaust gas side support the discharging of exhaust gas from the cylinders.

10. The piston engine according to claim 9, wherein
at least one microphone is connected to the control device in order to make possible a regulation for generating the pressure waves.

11. The piston engine according to claim 9, wherein
the control device is additionally at least one of configured and programmed so that it cumulatively or alternatively operates the respective electroacoustic converter at least in one of certain rotational speed ranges and certain load ranges for damping interference noises spreading in the fresh air system by means of anti-sound.

12. A method of operating an electroacoustic converter situated in a piston engine having an at least one cylinder and a fresh air system for supplying fresh air to the at least one cylinder, comprising:
    generating positive pressure waves in the fresh air system with the electroacoustic converter such that, during gas exchange, the positive pressure waves support a charging of the at least one cylinder of the piston engine with fresh air.

13. A method of operating an electroacoustic converter situated in a piston engine having a at least one cylinder and an exhaust system for removing exhaust gas from the at least one cylinder, comprising:
    generating negative pressure waves in the exhaust gas system with the electroacoustic converter such that, during gas exchange, the negative pressure waves support a discharging of the at least one cylinder of the piston engine of exhaust gas.

* * * * *

UNITED STATES PATENT AND TRADEMARK OFFICE
CERTIFICATE OF CORRECTION

PATENT NO. : 8,857,411 B2  
APPLICATION NO. : 13/096357  
DATED : October 14, 2014  
INVENTOR(S) : Jan Krüger et al.

Page 1 of 1

It is certified that error appears in the above-identified patent and that said Letters Patent is hereby corrected as shown below:

On the title page first column, after item (65), add

--(30)  Foreign Application Priority Data  
April 28, 2010   (DE) ................ 10 2010 018 659.7--

Signed and Sealed this  
Twenty-fourth Day of February, 2015

Michelle K. Lee  
*Deputy Director of the United States Patent and Trademark Office*